May 31, 1960 B. T. ELLIS, JR 2,939,090
COMBINED PLATE AND SCREEN GRID MODULATED AMPLIFIER CIRCUIT
Filed July 14, 1958
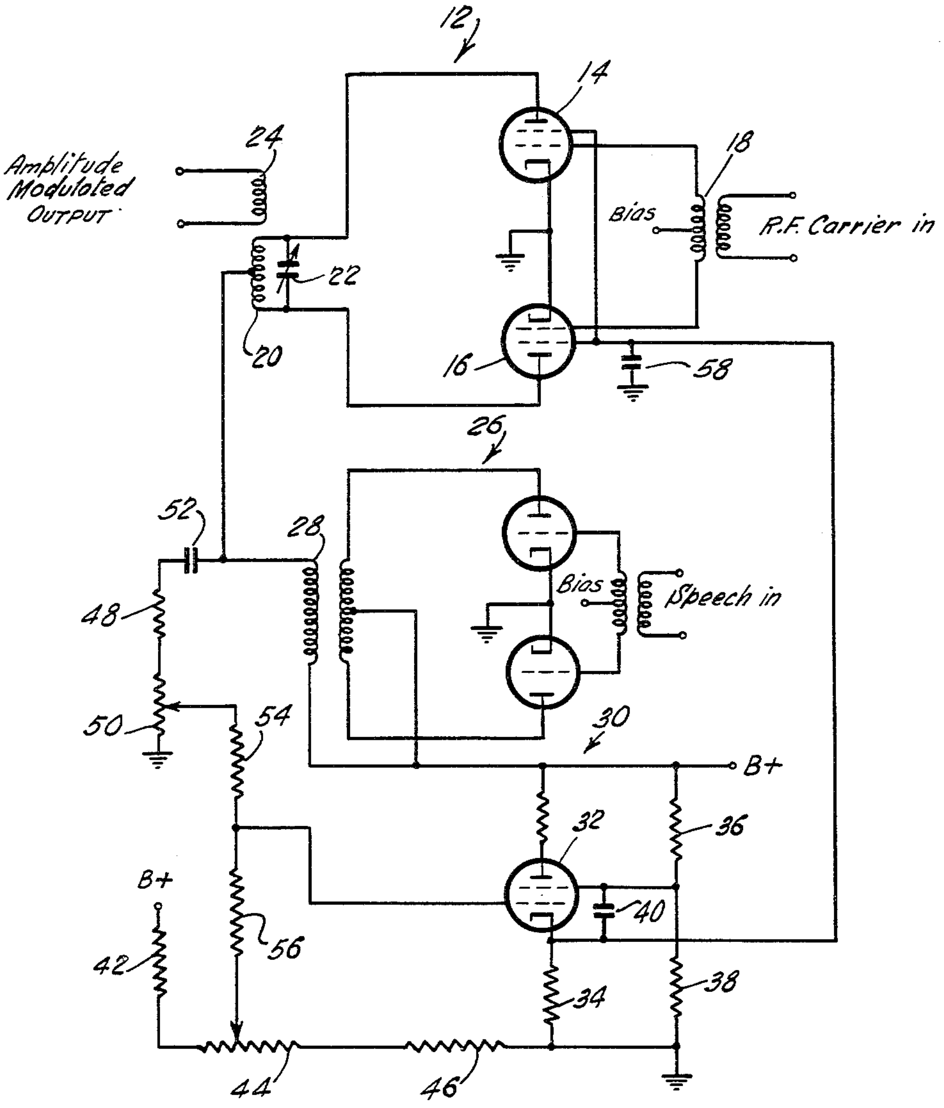
INVENTOR.
BERNARD T. ELLIS, Jr.
BY
Lee J. Hunzinger
ATTORNEYS

United States Patent Office 2,939,090

Patented May 31, 1960

2,939,090

COMBINED PLATE AND SCREEN GRID MODULATED AMPLIFIER CIRCUIT

Bernard T. Ellis, Jr., Madison, N.J., assignor, by mesne assignments, to the United States of America Filed July 14, 1958, Ser. No. 748,548

3 Claims. (Cl. 332—49)

This invention relates to improvements in plate-modulated amplifier circuits utilizing tetrodes and pentodes and more particularly to such circuits wherein the screen voltage-screen current characteristic of the tetrode or pentode is severely nonlinear.

In plate-modulated amplifier circuits for use at higher frequencies, particularly microwave frequencies, the tubes used are screen grid tubes namely tetrodes and pentodes for minimal grid-plate capacitance. However, in screen grid tubes, in contradistinction to triodes, pure plate modulation is unsatisfactory because the plate current is substantially independent of plate voltage except where the plate voltage is so low as to be unsuitable for normal operation. Furthermore, if the modulating voltage is applied to the plate only of a tetrode or pentode, the modulation characteristic is nonlinear. Satisfactory plate modulation of a tube with a screen grid may be achieved if plate and screen potentials are modulated in phase and the ratio of plate and screen modulating voltage is constant. This is due to the fact that plate current varies with the screen grid voltage of a tetrode or pentode in the same manner as the plate voltage of a triode varies with control grid voltage.

There have been unsuccessful attempts at pure screen grid modulation to replace plate and screen grid modulation. It has been found that if the modulating voltage is applied to the screen grid only, the results are not satisfactory because of consequent unsymmetrical modulation (predominantly downward).

Plate-modulated amplifiers utilizing screen-grid tubes are not broadly new. In one circuit known heretofore a resistor connects the screen grid to the plate circuit somewhere between the plate and the source of modulating voltage; in another circuit the screen grid is connected to a screen supply through an audio frequency choke coil for self-modulation of the screen voltage; in another circuit a tertiary winding on the modulation transformer provides screen modulation voltage but accurate phasing is difficult even with relatively low modulation frequencies. In the circuits known heretofore, leakage reactance limits their utility at higher modulation frequencies; also, they cannot be used where the screen grid characteristic of the tetrode or pentode is severely nonlinear. An example of a tetrode having a severely nonlinear screen grid characteristic because of screen-grid emission is the 4X150A, a microwave tetrode supplied commercially by Eitel-McCullough of San Bruno, California.

An object of this invention is to provide an improved plate-modulated amplifier circuit utilizing screen-grid tubes wherein the ratio of plate and screen modulating voltages is constant and wherein plate and screen modulation voltages are in phase.

Another object is to provide an improved plate-modulated amplifier circuit utilizing screen grid tubes wherein the shunting effect of the screen bypass condenser at high modulation frequencies is less than in prior art circuits.

Another object is to provide an improved plate-modulated amplifier circuit utilizing screen grid tubes wherein D.C. and A.C. screen voltages are separately adjustable and wherein there is good regulation of the D.C. screen voltage and wherein the plate and screen current circuits are isolated to preclude regenerative interaction.

Other objects and many of the attendant advantages of this invention will be readily appreciated as the same becomes better understood by reference to the following detailed description when considered in connection with the accompanying drawing wherein:

The single figure is a schematic diagram of an embodiment of this invention.

The illustrated embodiment includes a push-pull amplifier 12 having a pair of tetrodes 14, 16 whose control grids are coupled to a carrier frequency source by a transformer 18 and whose plate circuit is tuned to the carrier frequency by means of an output transformer winding 20 and variable condenser 22. The output of amplifier 12 is obtained from output transformer winding 24.

A push-pull speech amplifier 26 delivers the plate-modulating voltage to the amplifier 12 by way of its output transformer secondary winding 28 which is connected between the plate supply source and the centertap of transformer winding 20 in the plate circuit of amplifier 12. The amplifier 26 delivers the screen-grid modulating voltage to amplifier 12 by way of the cathode follower circuit 30.

Push-pull amplifiers are described herein for illustration only; the amplifiers need not be push-pull.

Cathode follower 30 includes a tetrode 32 in series with a cathode follower load resistance 34 and a plate resistance 36 for limiting the voltage across tetrode 32 to its rated maximum. An advantage of the tetrode over the triode in this cathode follower is that the desired transconductance can be developed without driving the control grid positive. The screen grid bias is obtained from a voltage divider network 36, 38. A high capacity bypass condenser connects the screen-grid and cathode and serves to maintain constant the instantaneous screen-to-cathode voltage. The control grid bias is obtained from an adjustable voltage divider network 42, 44, 46 and the signal input for the control grid is obtained from amplifier 26 by way of an adjustable voltage divider network 48 and 50 coupled to the modulation transformer winding 28 by a condenser 52. Condenser 52 and resistors 48 and 50 are large enough so that phase shift of the modulation signal therein is negligible. Isolating resistors 54, 56 connect the control grid of the tetrode 32 to the signal and biasing controls respectively and prevent interaction between the latter. The screen grids of tetrodes 14 and 16 are direct coupled to the output side of the cathode follower. An R.F. bypass condenser is connected between the screen grids of tetrodes 14 and 16 and ground.

In operation, the D.C. screen voltage for tetrodes 14 and 16 is supplied by the cathode follower 30 and because the cathode follower is a low impedance source the D.C. voltage is well regulated. This is important since the average screen current increases substantially with modulation. Without a well-regulated D.C. supply for the screen grids, there would be some carrier shift with increased screen current during modulation. The D.C. voltage on the screen grids is readily adjustable independently of the A.C. modulation voltage through adjustment of the control grid bias of the cathode follower. The percentage modulation of the screen grid voltage is independently adjustable through adjustment of the tap on resistor 50 in the cathode follower 30. The screen current circuit which includes the cathode follower 30 is independent of the plate current circuit in amplifier 30 thereby precluding regenerative interaction which might otherwise occur. The shunting effect of the screen bypass capacitor 58 increases with increase in modulation frequency. In this invention, this effect is substantially less than in the prior art circuits because the impedance of condenser 58 as compared to the impedance of the source of voltage for the screens, namely the cathode follower, is appreciable so that even at higher modulation frequencies the modulation voltage developed across the condenser 58 is appreciable, whereas in prior art circuits the condenser impedance is extremely low compared to the impedance of the modulation source and other circuit elements in series therewith. At the higher modulation frequencies, in the case of the latter, the voltage developed across the screen bypass condenser is too low for satisfactory results. With this invention, the modulation voltages on screen and plate are in phase over a wide range of modulation frequency. In prior art circuits, leakage reactance in circuit components produces considerable phase shift at higher modulation frequencies. The circuit hookup and adjustment of this invention can be readily carried out by one with experience in this art.

Obviously many modifications and variations of the present invention are possible in the light of the above teachings. It is therefore to be understood that within the scope of the appended claims the invention may be practiced otherwise than as specifically described.

I claim:

1. An improved combined plate and screen grid modulation circuit wherein screen current is drawn comprising an amplifier including a tube with a control grid and a screen grid and having a screen voltage-screen current characteristic that is severely non-linear, means coupling carrier frequency energy into the control grid of said tube, a source of modulation voltage in series in the plate circuit of said amplifier, a cathode follower having a control grid circuit with independently adjustable bias and signal amplitude controls, the signal amplitude control portion of the grid circuit of said cathode follower being substantially distortionless and being coupled to said source of modulation voltage to deliver a selected fraction of the output energy of said source to said cathode follower in phase with the modulation voltage delivered to the plate circuit of said amplifier, the output side of said cathode follower being direct coupled to the screen grid of said tube, a carrier frequency bypass condenser whose impedance to the highest anticipated modulation frequency is substantially higher than the output impedance of said cathod follower, said bypass condenser being connected between screen grid and cathode of said tube; whereby substantially in-phase modulation voltages in constant ratio are delivered to the plate and screen grid of said tube and whereby the shunting effect of said carrier frequency bypass condenser on higher modulation frequencies is not unduly great because the impedance of said cathode follower output is low compared to the impedance of said carrier bypass condenser even at the higher modulation frequencies and whereby the direct current and alternating current voltages on the screen grid of said tube are independently adjustable by adjustment of the controls in the grid circuit of said cathode follower and the direct current voltage on the screen grid is well regulated due to the low impedance output of said cathode follower and the direct coupling between said cathode follower and said screen grid of said tube, and whereby the plate and screen current circuits of said amplifier are isolated precluding regenerative interaction therebetween.

2. A combined plate and screen grid modulation circuit as defined in claim 1 wherein said cathode follower includes a tube having a screen grid whereby the transconductance may be substantial without driving the control grid thereof positive.

3. A combined plate and screen grid modulation circuit as defined in claim 1 wherein the control grid circuit of said cathode follower includes two independently adjustable resistive voltage dividers, one for D.C. bias and one for input signal and isolating resistors connecting the control grid of said cathode follower to said voltage dividers respectively.

References Cited in the file of this patent

UNITED STATES PATENTS

| | | |
|---|---|---|
| 2,002,209 | Nordahl | May 21, 1935 |
| 2,432,720 | Brown | Dec. 16, 1947 |
| 2,500,645 | Rich | Mar. 14, 1950 |
| 2,862,187 | Frost et al. | Nov. 25, 1958 |